United States Patent
Onodera

(10) Patent No.: US 10,872,709 B2
(45) Date of Patent: Dec. 22, 2020

(54) METHOD FOR PRODUCING POLYANILINE COMPLEX COMPOSITION AND POLYANILINE COMPLEX COMPOSITION

(71) Applicant: IDEMITSU KOSAN CO., LTD., Tokyo (JP)

(72) Inventor: Shingo Onodera, Sodegaura (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 56 days.

(21) Appl. No.: 15/325,286

(22) PCT Filed: Jul. 9, 2015

(86) PCT No.: PCT/JP2015/003470
§ 371 (c)(1),
(2) Date: Jan. 10, 2017

(87) PCT Pub. No.: WO2016/006251
PCT Pub. Date: Jan. 14, 2016

(65) Prior Publication Data
US 2017/0194068 A1 Jul. 6, 2017

(30) Foreign Application Priority Data
Jul. 11, 2014 (JP) .................. 2014-143573

(51) Int. Cl.
*H01B 1/12* (2006.01)
*C08J 7/14* (2006.01)
*C08K 5/13* (2006.01)
*C08K 5/42* (2006.01)
*B32B 27/28* (2006.01)
*C08G 73/02* (2006.01)
*C08K 5/375* (2006.01)
*C08L 79/02* (2006.01)

(52) U.S. Cl.
CPC .............. *H01B 1/12* (2013.01); *B32B 27/281* (2013.01); *C08G 73/0266* (2013.01); *C08J 7/14* (2013.01); *C08K 5/13* (2013.01); *C08K 5/375* (2013.01); *C08K 5/42* (2013.01); *C08L 79/02* (2013.01); *H01B 1/124* (2013.01); *H01B 1/128* (2013.01); *B32B 2307/202* (2013.01)

(58) Field of Classification Search
CPC .......... H01B 1/128; H01B 1/12; H01B 1/124; C08G 73/0266; C08K 5/42
See application file for complete search history.

(56) References Cited

U.S. PATENT DOCUMENTS

| | | | |
|---|---|---|---|
| 5,232,631 A | 8/1993 | Cao et al. | |
| 5,624,605 A | 4/1997 | Cao et al. | |
| 5,626,795 A | 5/1997 | Smith et al. | |
| 5,959,832 A | 9/1999 | Kobayashi et al. | |
| 5,968,416 A | 10/1999 | Smith et al. | |
| 2007/0108420 A1 | 5/2007 | Kuramoto | |
| 2009/0110811 A1 | 4/2009 | Ding et al. | |
| 2012/0135255 A1 | 5/2012 | Onodera et al. | |
| 2012/0225310 A1* | 9/2012 | Totsuka .................. | C08K 5/13 428/523 |

FOREIGN PATENT DOCUMENTS

| | | |
|---|---|---|
| CN | 102482503 A | 5/2012 |
| JP | H 8-143771 A | 6/1996 |
| JP | 3384566 B2 | 12/2002 |
| JP | 2008-169255 A | 7/2008 |
| JP | 2011-501379 A | 1/2011 |
| TW | 201107391 A | 3/2011 |
| WO | WO 2005/052058 A1 | 6/2005 |
| WO | WO 2010/143450 A1 | 12/2010 |

OTHER PUBLICATIONS

Beadle et al., "Synthetic Metals", The Journal of Conducting Polymers and Molecular Metals, Elsevier, ISSN 0379-6779, pp. 29-45, vol. 95, No. 1, May 30, 1998.
S.-H Lee et al., "Advanced Functional Materials", ISSN 1616-301X, Sep. 2005, pp. 1495-1500, vol. 15, No. 9.
The Journal of Physical Chemistry, American Chemical Society, Feb. 16, 1995, pp. 2224-2235, No. 7, vol. 99.
International Search Report issued in PCT/JP2015/003470 dated Oct. 6, 2015.
Translation of Written Opinion issued in PCT/JP2015/003470 dated Jan. 26, 2017.
Taiwanese Office Action dated Feb. 15, 2019 in corresponding application No. 104122543.
Chinese Office Action dated May 7, 2019 in corresponding application No. 201580027931.3.

* cited by examiner

*Primary Examiner* — Haidung D Nguyen
(74) *Attorney, Agent, or Firm* — Foley & Lardner LLP

(57) ABSTRACT

A method for producing a polyaniline complex composition including: removing a solvent from an organic solution that includes (a) polyaniline doped with a compound represented by M(XARn)m (I) and (b) a phenolic compound, thereby to obtain a composition; and immersing the composition in (c) a solution that comprises at least one of sulfonic acid and sulfonate, followed by drying.

31 Claims, 1 Drawing Sheet

METHOD FOR PRODUCING POLYANILINE COMPLEX COMPOSITION AND POLYANILINE COMPLEX COMPOSITION

CROSS-REFERENCE TO RELATED APPLICATIONS

The present application is a U.S. national stage application of International Patent Application No. PCT/JP2015/003470, filed Jul. 9, 2015, which claims the benefit of priority to Japanese Patent Application No. 2014-143573, filed Jul. 11, 2014, the entireties of which are hereby incorporated by reference.

TECHNICAL FIELD

The invention relates to a method for producing a polyaniline complex composition and a polyaniline complex composition.

BACKGROUND ART

A conductive polymer is used as a solid electrolyte for a capacitor, an electromagnetic wave absorbing coating agent, an antistatic coating agent, an undercoating agent for electroplating, conductive ink for circuit wiring or the like.

Polyaniline as one of conductive polymers have, in addition to the electric properties thereof, advantages and properties that it can be synthesized relatively easily from inexpensive aniline and exhibit excellent stability to oxygen or the like in the conductive state.

It is possible to obtain highly conductive polyaniline easily by the method disclosed in Patent Document 1. In order to realize its application to a solid electrolyte of a capacitor or the like, polyaniline is required to be improved in heat resistance.

In the method disclosed in Patent Document 2, although it is possible to suppress an increase in resistance when heated for a short period of time, it is unclear whether it is possible to suppress an increase in resistance when heated for a long period of time of 500 hours or longer, which long-time heating poses problems in actual use.

RELATED ART DOCUMENTS

Patent Documents

Patent Document 1: WO2010/143450
Patent Document 2: JP-T-2011-501379

SUMMARY OF THE INVENTION

An object of the invention is to provide a method for producing a polyaniline complex composition and a polyaniline complex composition that can suppress an increase in resistance when heated for a long period of time.

According to the invention, the following method for producing a polyaniline complex composition or the like are provided.
1. A method for producing a polyaniline complex composition comprising:
removing a solvent from an organic solution that comprises (a) polyaniline doped with a compound represented by the following formula (I) and (b) a phenolic compound, thereby to obtain a composition; and
immersing the composition in (c) a solution that comprises at least one of sulfonic acid and sulfonate, followed by drying:

$$M(XARn)m \qquad (I)$$

wherein M is a hydrogen atom, an organic free radical or an inorganic free radical, and m is a value of [valence of M/valence of X];
X is an anion group;
A is a hydrocarbon group that may comprise a substituent;
R is a group represented by —H, —$R^1$, —$OR^1$, —$COR^1$, —$COOR^1$, —(C=O)—($COR^1$) or —(C=O)—($COOR^1$), and at least one of R is a group represented by —$COOR^1$ or —(C=O)—($COOR^1$);
wherein $R^1$ is a hydrocarbon group that may comprise a substituent, a silyl group, an alkylsilyl group, a group represented by —($R^2O$)x-$R^3$ or a group represented by —($OSiR^3{}_2$)x-$OR^3$ ($R^2$ is independently an alkylene group, $R^3$ is independently a hydrocarbon group, and x is an integer of 1 or more); and
n is an integer of 1 or more.
2. A method for producing a polyaniline complex composition comprising:
removing a solvent from an organic solution that comprises (a) polyaniline doped with a compound represented by the following formula (I), (b) a phenolic compound, and an acidic substance or a salt of the acidic substance, thereby to obtain a composition; and
immersing the composition in (c) a solution that comprises at least one of sulfonic acid and sulfonate, followed by drying:

$$M(XARn)m \qquad (I)$$

wherein M is a hydrogen atom, an organic free radical or an inorganic free radical, and m is a value of [valence of M/valence of X];
X is an anion group;
A is a hydrocarbon group that may comprise a substituent;
R is a group represented by —H, —$R^1$, —$OR^1$, —$COR^1$, —$COOR^1$, —(C=O)—($COR^1$) or —(C=O)—($COOR^1$), and at least one of R is a group represented by —$COOR^1$ or —(C=O)—($COOR^1$);
wherein $R^1$ is a hydrocarbon group that may comprise a substituent; a silyl group; an alkylsilyl group; a group represented by —($R^2O$)x-$R^3$ or a group represented by —($OSiR^3{}_2$)x-$OR^3$ ($R^2$ is independently an alkylene group, $R^3$ is independently a hydrocarbon group, and x is an integer of 1 or more); and
n is an integer of 1 or more.
3. The method for producing a polyaniline complex composition according to 2, wherein the acidic substance is an organic acid.
4. The method for producing a polyaniline complex composition according to 2 or 3, wherein the acidic substance is one or more acidic substances comprising one or more acidic groups selected from a sulfonic acid group, a phosphoric acid group, a phosphonic acid group and a carboxy group.
5. The method for producing a polyaniline complex composition according to any one of 2 to 4, wherein the acidic substance is a cyclic, chain-like or branched alkyl acid comprising one or more acidic groups.
6. The method for producing a polyaniline complex composition according to any one of 2 to 4, wherein the acidic substance is a substituted or unsubstituted aromatic acid having one or more acidic groups.

7. The method for producing a polyaniline complex composition according to 6, wherein the aromatic acid is an acid comprising a naphthalene skeleton.

8. The method for producing a polyaniline complex composition according to any one of 1 to 7, wherein aniline doped with the compound represented by the formula (I) is polymerized at a temperature of 0° C. or lower, thereby to obtain the polyaniline.

9. The method for producing a polyaniline complex composition according to any one of 1 to 8, wherein the compound represented by the formula (I) is diisooctylsulfosuccinate.

10. The method for producing a polyaniline complex composition according to any one of 1 to 9, wherein the phenolic compound is alkoxy phenol, alkyl phenol or alkyl naphthol.

11. The method for producing a polyaniline complex composition according to any one of 1 to 10, wherein the phenolic compound is amyl phenol, methoxy phenol or isopropyl phenol.

12. The method for producing a polyaniline complex composition according to any one of 1 to 11, wherein the phenolic compound is p-tert-amylphenol, 4-methoxy phenol or 4-isopropyl phenol.

13. The method for producing a polyaniline complex composition according to any one of 1 to 12, wherein the sulfonic acid or the sulfonate is aromatic sulfonic acid or aromatic sulfonate.

14. The method for producing a polyaniline complex composition according to any one of 1 to 13, wherein the sulfonic acid or the sulfonate is a compound represented by the following formula (4) or (5), or salt thereof;

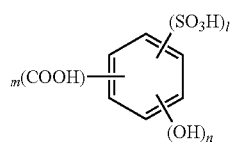

(4)

wherein in the formula (4), l is 1 or more, m is 0 or more and n is 0 or more, and if one of m and n is 0 the other is 1 or more; and

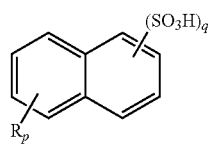

(5)

wherein in the formula (5), q is 1 or more, p is 0 or more, R is independently an alkyl group including 1 to 20 carbon atoms, a carboxy group, a hydroxyl group, a nitro group, a cyano group or an amino group.

15. The method for producing a polyaniline complex composition according to any one of 1 to 14, wherein the sulfonic acid or the sulfonate is naphthalene sulfonic acid, phenol sulfonic acid, sulfophthalic acid, sulfoisophthalic acid, sulfosalcylic acid or salt thereof.

16. A polyaniline complex composition that is produced by the method according to any one of 1 to 15.

17. A polyaniline complex conductive film composed of the polyaniline complex composition according to 16.

18. A capacitor that comprises the polyaniline complex conductive film according to 17.

19. A conductive stacked body comprising:
a substrate; and
the polyaniline complex conductive film according to claim 17 that is stacked on the substrate.

20. A conductive article obtained by forming the conductive stacked body according to 19.

According to the invention, it is possible to provide a method for producing a polyaniline complex composition and a polyaniline complex composition, which composition can suppress an increase in resistance even heated for a long period of time.

MODE FOR CARRYING OUT THE INVENTION

Figure 1:
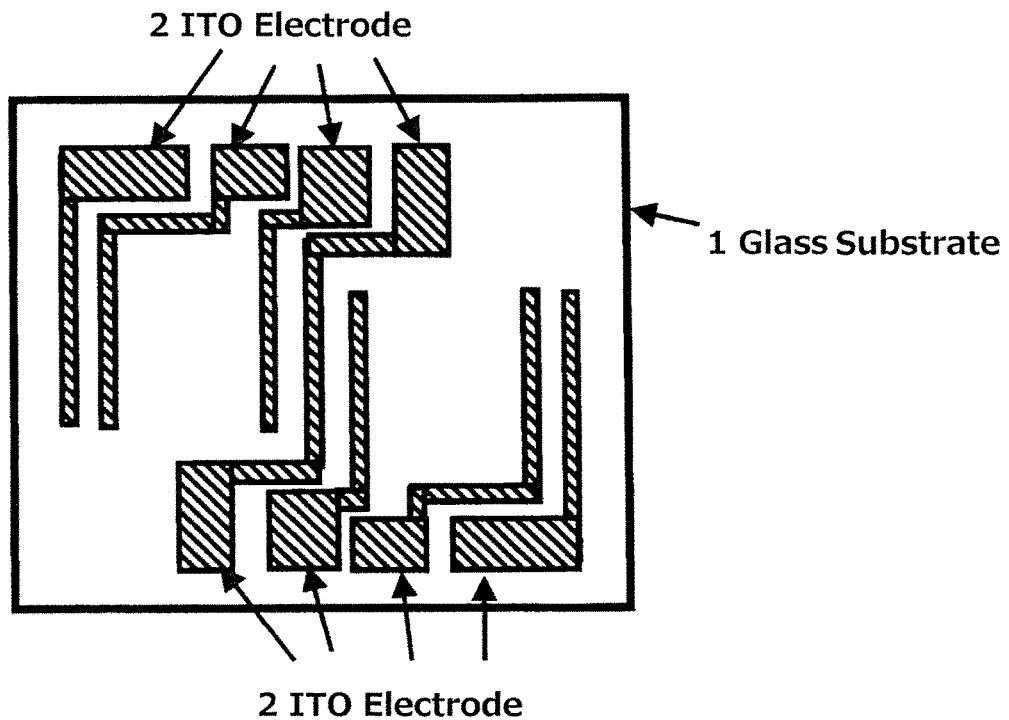
FIG. 1 is a view showing an upper surface of a glass substrate on which an indium tin oxide (ITO) electrode is formed.

The method for producing a polyaniline complex composition is a method comprising: removing a solvent from an organic solution that comprises (a) polyaniline doped with a compound represented by the following formula (I) and (b) a phenolic compound, thereby to obtain a composition; and immersing the composition in (c) a solution that comprises at least one of sulfonic acid and sulfonate, followed by drying:

$$M(XARn)m \qquad (I)$$

wherein M is a hydrogen atom, an organic free radical or an inorganic free radical, and m is a value of [valence of M/valence of X];

X is an anion group;

A is a hydrocarbon group that may comprise a substituent;

R is a group represented by —H, —R$^1$, —OR$^1$, —COR$^1$, —COOR$^1$, —(C=O)—(COR$^1$) or —(C=O)—(COOR$^1$), and at least one of R is a group represented by —COOR$^1$ or —(C=O)—(COOR$^1$);

wherein R$^1$ is a hydrocarbon group that may comprise a substituent, a silyl group, an alkylsilyl group, a group represented by —(R$^2$O)x-R$^3$ or a group represented by —(OSiR$^3{}_2$)x-OR$^3$ (R$^2$ is independently an alkylene group, R$^3$ is independently a hydrocarbon group, and x is an integer of 1 or more); and n is an integer of 1 or more.

In addition, the polyaniline complex composition of the invention can be obtained by removing a solvent from an organic solution that comprises (a) polyaniline doped with a compound represented by the above formula (I) and (b) a phenolic compound, thereby to obtain a composition; and immersing the composition in (c) a solution that comprises at least one of sulfonic acid and sulfonate, followed by drying.

It is preferred that the polyaniline complex composition of the invention be a polyaniline complex conductive film.

Any shape may be taken, i.e. it may be a plate-like shape, a rod-like shape, etc. The polyaniline complex composition can be processed into a desired shape by a known method such as vacuum shaping or pressure shaping.

The polyaniline complex composition obtained by the method of the invention can significantly suppress an increase in resistance caused by heating for a long period of time.

M in the formula (I) is a hydrogen atom, an organic free radical group or an inorganic free radical group.

As the above-mentioned organic free radical group, a pyridinium group, an imidazolium group and an anilinium group can be given, for example. As the above inorganic free radical group, lithium, sodium, potassium, cesium, ammonium, calcium, magnesium and iron can be given, for example.

X in the formula (I) is an anion group. As the examples of X, a —$SO_3^-$ group, a —$PO_3^{2-}$ group, a —$PO_4(OH)^-$ group, a —$OPO_3^{2-}$ group, a —$OPO_2(OH)^-$ group and a —$COO^-$ group can be given, with a —$SO_3^-$ group being preferable.

A in the formula (I) (A in (M(XARn)m) is a substituted or unsubstituted hydrocarbon group.

The above-mentioned hydrocarbon group is a chain-like or cyclic saturated aliphatic hydrocarbon group, a chain-like or cyclic unsaturated hydrocarbon group or an aromatic hydrocarbon group.

As the chain-like saturated aliphatic hydrocarbon group, a straight-chain or branched alkyl group can be given. As the cyclic saturated aliphatic hydrocarbon group, a cycloalkyl group such as a cyclopentyl group, a cyclohexyl group, a cycloheptyl group and a cyclooctyl group can be given. The cyclic saturated aliphatic hydrocarbon group may be one in which a plurality of cyclic saturated aliphatic hydrocarbon groups are fused. A norbornyl group, an adamantyl group and a fused adamantyl group can be given, for example. As the aromatic hydrocarbon group, a phenyl group, a naphthyl group and an anthracenyl group can be given. As the chain-like unsaturated aliphatic hydrocarbon group, a straight-chain or branched alkenyl group can be given.

As the substituent when A is a substituted hydrocarbon group, an alkyl group, a cycloalkyl group, a vinyl group, an allyl group, an aryl group, an alkoxy group, a halogen group, a hydroxyl group, an amino group, an imino group, a nitro group, a silyl group or an ester group can be given.

R in the formula (I) is bonded with A, and is independently a substituent represented by —H, —$R^1$, —$OR^1$, —$COR^1$, —$COOR^1$, —(C=O)—($COR^1$) or —(C=O)—($COOR^1$). $R^1$ is a hydrocarbon group that may comprise a substituent, a silyl group, an alkylsilyl group, a —$(R^2O)x$-$R^3$ group or a —$(OSiR^3{}_2)x$-$OR^3$ ($R^2$ is independently an alkylene group and $R^3$ is independently a hydrocarbon group, and x is an integer of 1 or more).

As the hydrocarbon group represented by $R^1$, a methyl group, an ethyl group, a straight-chain or branched butyl group, a pentyl group, a hexyl group, a heptyl group, an octyl group, a nonyl group, a decyl group, a dodecyl group, a pentadecyl group, an eicosanyl group or the like can be given. As the substituent of the hydrocarbon group, an alkyl group, a cycloalkyl group, a vinyl group, an allyl group, an aryl group, an alkoxy group, a halogen group, a hydroxy group, an amino group, an imino group, a nitro group or an ester group can be given.

As the alkylsilyl group of $R^1$, a dimethylsilyl group and a diethylsilyl group can be given.

The same hydrocarbon groups as those for $R^1$ can be given for the hydrocarbon group of $R^3$.

As the alkylene group of $R^2$, a methylene group, an ethylene group, a propylene group or the like can be given, for example.

n in the formula (I) is an integer of 1 or more, and m in the formula (I) is a value of valence of M/valence of X.

As the compound represented by the formula (I), dialkylbenzenesulfonic acid, dialkylnaphthalenesulfonic acid or a compound having two or more ester bonds is preferable.

As the above-mentioned compound having two or more ester bonds, a sulfophthalic acid ester or a compound represented by the following formula (II) is more preferable.

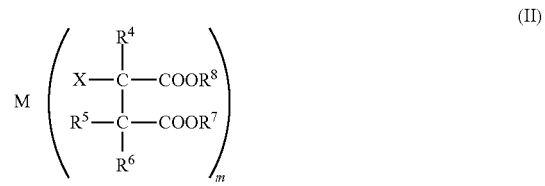

wherein in the formula, M, X and m are the same as those defined in the formula (I). As X, a —$SO_3^-$ group is preferable.

$R^4$, $R^5$ and $R^6$ in the formula (II) are independently a hydrogen atom, a hydrocarbon group or a $R^9{}_3Si$— group (wherein $R^9$ is a hydrocarbon group and the three $R^9$s may be the same as or different from each other).

As the hydrocarbon group when $R^4$, $R^5$ and $R^6$ are hydrocarbon groups, a straight-chain or branched alkyl group including 1 to 24 carbon atoms, an aryl group including an aromatic ring, an alkylaryl group or the like can be given.

As the hydrocarbon group of $R^9$, the same hydrocarbon groups as those for $R^4$, $R^5$ and $R^6$ can be given.

$R^7$ and $R^8$ in the formula (II) are independently a hydrocarbon group or a —$(R^{10}O)_q$—$R^{11}$ group (wherein $R^{10}$ is a hydrocarbon group or a silylene group, $R^{11}$ is a hydrogen atom, a hydrocarbon group or $R^{12}{}_3Si$— (wherein $R^{12}$ is a hydrocarbon group and three $R^{12}$s may be the same as or different from each other) and q is an integer of 1 or more).

As the hydrocarbon group when $R^7$ and $R^8$ are hydrocarbon groups, a straight-chain or branched alkyl group including 1 to 24, preferably 4 or more carbon atoms, an aryl group including an aromatic ring, an alkylaryl group or the like can be given. As specific examples of the hydrocarbon group when $R^7$ and $R^8$ are hydrocarbon groups, straight-chain or branched butyl, pentyl, hexyl, octyl, decyl or the like can be given.

In $R^7$ and $R^8$, as the hydrocarbon group when $R^{10}$ is a hydrocarbon group, a straight-chain or branched alkylene group including 1 to 24 carbon atoms, an arylene group including an aromatic ring, an alkylarylene group and an arylalkylene group can be given, for example. As the hydrocarbon group in $R^7$ and $R^8$ when $R^{11}$ and $R^{12}$ are hydrocarbon groups, the same hydrocarbon groups as those for $R^4$, $R^5$ and $R^6$ can be given. q is preferably 1 to 10.

As specific examples of the compound represented by the formula (II) when $R^7$ and $R^8$ are a —$(R^{10}O)_q$—$R^{11}$ group, the two compounds represented by the following formulas can be given.

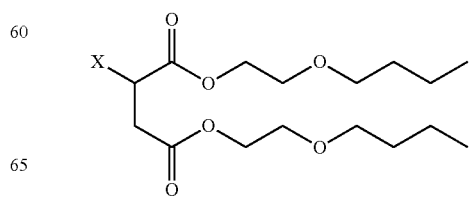

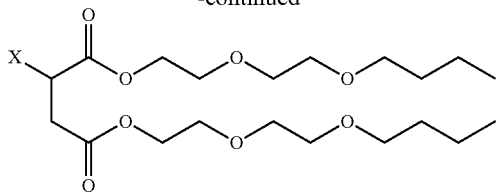

(wherein X is the same as that in the formula (I))

It is further preferred that the compound represented by the above formula (II) is a sulfosuccinic acid derivative represented by the following formula (III).

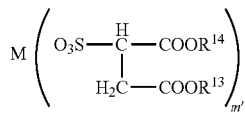

(wherein M is the same as in the formula (I); and m' is a valence of M)

$R^3$ and $R^{14}$ in the formula (III) are independently a hydrocarbon group or a —$(R^{15}O)_r$—$R^{16}$ group wherein $R^{15}$ is independently a hydrocarbon group or a silylene group; and $R^{16}$ is a hydrogen atom, a hydrocarbon atom or a $R^{17}_3Si$— group (wherein $R^{17}$ is independently a hydrocarbon group), and r is an integer of 1 or more.

As the hydrocarbon group when $R^{13}$ and $R^{14}$ are hydrocarbon groups, the same hydrocarbon groups as those for $R^7$ and $R^8$ can be given.

In $R^{13}$ and $R^{14}$, as the hydrocarbon group when $R^{15}$ is a hydrocarbon group, the same hydrocarbon groups as those for $R^{10}$ mentioned above can be given. As the hydrocarbon group when $R^{16}$ and $R^{17}$ are hydrocarbon groups, the same hydrocarbon groups as those for $R^4$, $R^5$ and $R^6$ mentioned above can be given.

r is preferably 1 to 10.

As for specific examples when $R^{13}$ and $R^{14}$ are a —$(R^{15}O)_r$—$R^{16}$ group, the same groups as those for —$(R^{10}O)_q$—$R^{11}$ in $R^7$ and $R^8$ can be given.

As the hydrocarbon group of $R^{13}$ and $R^{14}$, the same hydrocarbon groups as those for $R^7$ and $R^8$ can be given, with a butyl group, a hexyl group, a 2-ethylhexyl group, a decyl group or the like being preferable.

The compound represented by the formula (I) is preferably sodium diisooctylsulfosuccinate.

As for the compound represented by the formula (I), it is known that conductivity or solubility in a solvent of doped polyaniline can be controlled by changing the structure thereof (U.S. Pat. No. 3,384,566). In the invention, the optimum compound represented by the formula (I) can be selected according to properties required in accordance with application.

In the organic solution, the content of the compound represented by the formula (I) is preferably 0.1 to 0.7 mol, more preferably 0.3 to 0.6 mol, and further preferably 0.45 to 0.55 mol, per mol of an aniline monomer.

If the content of the compound represented by the formula (I) is larger than this range, separation and purification may become difficult.

The above-mentioned polyaniline is substituted or unsubstituted polyaniline. In respect of versatility and economy, the above-mentioned polyaniline is preferably an unsubstituted polyaniline.

As the substituent for the substituted polyaniline, a straight-chain or branched hydrocarbon group such as a methyl group, an ethyl group, a hexyl group and an octyl group; an alkoxy group such as a methoxy group and an ethoxy group; an aryloxy group such as a phenoxy group; a halogenated hydrocarbon such as a trifluoromethyl group (—$CF_3$ group), etc. can be given.

It is preferred that the polyaniline molecules have a weight average molecular weight of 10,000 or more, more preferably 20,000 or more, further preferably 30,000 or more and 1,000,000 or less, further preferably 40,000 or more and 1,000,000 or less, with 52,000 or more and 1,000,000 or less, and 70,000 or more and 1,000,000 or less being particularly preferable.

If the weight-average molecular weight of the polyaniline molecules is less than 10,000, the strength or extensibility of a conductive product obtained from a polyaniline complex composition containing the polyaniline molecules may be lowered.

The molecular weight distribution is 1.5 to 10.0, for example. In respect of conductance, a smaller molecular distribution is preferable. In respect of solubility in a solvent and moldability, a wider molecular weight distribution may be preferable.

The molecular weight and the molecular weight distribution mentioned above can be measured by gel permeation chromatograph (GPC).

The doped polyaniline is dissolved in a solvent. The "dissolved" means that the polyaniline is homogenously dissolved on the molecular basis. By this, a homogenous polyaniline coating film with no clear grain boundary can be obtained when removing the solvent by drying.

The doped polyaniline is doped with the compound represented by the formula (I).

The doping of polyaniline with the compound represented by the formula (I) means that a charge moving vehicle (carrier) that can be moved freely is injected into polyaniline by the compound represented by the formula (I).

The doping ratio a of the doped polyaniline is preferably 0<a<1, more preferably 0.7 or less, further preferably 0.2<a<0.7, and most preferably 0.4<a<0.7.

The doping ratio is generally defined by (the number of moles of the dopant that dopes the conductive polymer)/(the monomer unit of the conductive polymer).

If the doping ratio is 0.2 or less, conductivity and solubility in a solvent of polyaniline may be lowered. Further, if the doping ratio is 0.7 or more, conductivity is lowered.

A doping ratio a of the compound represented by the formula (I) of 0.5 means that a single molecule of the compound represented by the formula (I) is doped per two nitrogen atoms.

The doped polyaniline is produced, for example, by a method in which the compound represented by the formula (I), an aqueous solution of phosphoric acid having a phosphoric acid concentration of 9 wt % to 19 wt %, an emulsifier that is different from the compound represented by the formula (I), substituted or unsubstituted aniline (the substituents are the same as those of polyaniline) and a solvent having a polarity lower than that of water are mixed to prepare a solution having two liquid phases, i.e. a water phase and a low-polarity solvent phase, and the aniline is subjected to chemical oxidation polymerization.

By allowing the phosphoric acid concentration and the polymerization temperature to be prescribed values, it is possible to prepare straight-chain polyaniline having a small amount of branched structures and having a large molecular weight, and as a result, is possible to improve the conductivity of polyaniline. Further, it is also possible to produce polyaniline stably while suppressing freezing of the water phase even under low-temperature conditions. In addition, it is possible to improve heat resistance of the polyaniline complex composition.

The "solution having two liquid phases" means a state where two incompatible liquid phases are present in a solution. Normally, it means a state where a water phase (high-polarity solvent phase) and a low-polarity solvent phase are present in a solution.

The "solution having two liquid phases" also includes a state in which one of the liquid phases is a continuous phase and the other liquid phase is a dispersed phase. For example, it includes a state in which the water phase is a continuous phase and the "low-polarity solvent phase" is a dispersed phase and a state in which the "low-polarity solvent phase" is a continuous phase and the water phase is a dispersed phase.

As examples of the low-polarity solvent, an aromatic hydrocarbon such as toluene and xylene is preferable.

It is preferred that chemical oxidation polymerization of aniline be conducted at 7° C. or lower, more preferably 5° C. or lower, further preferably 00° C. or lower, particularly preferably −15° C. to −2° C., and most preferably −10° C. to −3° C. The polymerization temperature may be changed in the midst of the polymerization reaction in the above-mentioned temperature range.

Within the above-mentioned range, conductivity and heat resistance can be further improved.

When forming a conductive polymer such as polyaniline by polymerization, it is known that, in general, a lower polymerization temperature leads to a higher conductivity.

If the polymerization temperature is low, the molecular weight is increased, and occurrence of side effects is suppressed, and as a result, a molecular chain having a structure closer to a straight chain and suffering less structural defects such as branching or cross-linking can be obtained.

In the "Beadle et al., Synth. Met., 1998, 95 29 to 45", there is a statement that, when conducting polyaniline polymerization of a water single phase, by preventing freezing of a reaction liquid by adding a metal salt such as LiCl or ethanol, the polymerization is conducted at a low temperature of −43° C., and as a result, high conductivity of 323 S/cm is realized.

In "S.-H. Lee et al., Adv. Funct. Mater., 2005 15 1495-1500", polyaniline with a high conductivity of 600 to 800 S/cm is obtained by conducting polyaniline polymerization at −35° C. in a water/chloroform two phase system.

In JP-A-2008-169255, by conducting polyaniline polymerization at −18° C. in a water-isooctane two phase system, polyaniline with a high conductivity of 789 S/cm is obtained.

From the above, when conducting polymerization of conductive polymers such as polyaniline, irrespective of the type of the reaction system (i.e. whether the reaction system is a water single phase or an oil-in-water two phase) or irrespective of the type of an acid used (methanesulfonic acid, phosphoric acid, hydrochloric acid, sulfuric acid, etc.) or the type of a dopant used, generally, it is preferred that the polymerization temperature be low.

The phosphoric acid concentration of the aqueous solution of phosphoric acid is 9 wt % to 30 wt %, for example, preferably 9 wt % to 19 wt %, and more preferably 10 wt % to 15 wt %.

The content of the aqueous solution of phosphoric acid is normally 1,000 to 10,000 ml per mol of an aniline monomer.

As the emulsifier, any of an ionic emulsifier in which a hydropholic part is ionic and a non-ionic emulsifier in which a hydropholic part is non-ionic can be used, and one or two or more emulsifiers may be used in a mixture.

As the ionic emulsifier, a cationic emulsifier, an anionic emulsifier and a bi-ionic emulsifier can be given.

As specific examples of the anionic emulsifier (cationic emulsifier), fatty acids, disproportionated rosin soaps, higher alcohol esters, polyoxyethylene alkyl ether phosphoric acid, alkenyl succinic acid, sarcosinate and their salts can be given.

As specific examples of the cationic emulsifier (anionic emulsifier), alkyldimethylbenzyl ammonium salts and alkyltrimethyl ammonium salts can be given.

As specific examples of a zwitterionic emulsifier (amphoteric emulsifier), alkyl betaine type, alkyl amide betaine type, and amino acid type, amine oxide type can be given.

As specific examples of a non-ionic emulsifier, polyoxyethylene alkylether, polypropylene glycol polyethylene glycol ether, polyoxyethylene glycerol borate fatty acid ester, and polyoxyethylene sorbitan fatty acid ester can be given.

Among the above-mentioned emulsifiers, anionic emulsifiers and non-ionic emulsifiers are preferable.

As the anionic emulsifier, an anionic emulsifier having a phosphoric acid ester structure is further preferable. As the non-ionic emulsifier, a non-ionic emulsifier having a polyoxyethylene sorbitan fatty acid ester structure is further preferable.

The amount of an emulsifier is preferably 0.001 to 0.1 mol, more preferably 0.002 to 0.02 mol, and further preferably 0.003 to 0.01 mol, relative to 1 mol of an aniline monomer.

If the amount of an emulsifier is larger than the above-mentioned range, there is a possibility that, after completion of the polymerization, the "high-polarity solvent phase" and the "low-polarity solvent phase" cannot be separated.

As the oxidizing agent used for chemical oxidation polymerization (hereinafter, often referred to as the oxidation polymerization agent), sodium persulfate, potassium persulfate, ammonium persulfate, peroxides such as hydrogen peroxide; ammonium dichlromate, ammonium perchlorate, potassium iron sulfate (III), ferric chloride (III), manganese dioxide, iodic acid, potassium permanganate, paratoluene sulfonic iron or the like can be used. As the oxidizing agent, persulfates such as ammonium persulfate are preferable.

These oxidizing agents may be used alone or in combination of two or more.

The amount of an oxidizing agent used is preferably 0.05 to 1.8 mol, more preferably 0.8 to 1.6 mol, and further preferably 1.2 to 1.4 mol, per 1 mol of an aniline monomer. By allowing the amount of the oxidizing agent to be within the above-mentioned range, the satisfactory degree of polymerization can be obtained. Since aniline is sufficiently polymerized, liquid separation and collection is easy and there is no fear that solubility of the polymer is lowered.

No specific restrictions are imposed on the phenolic compound, and the phenolic compound is a compound represented by ArOH (wherein Ar is an aryl group or a substituted aryl group). Specific examples thereof include phenol, substituted phenol derivatives such as o-, m- or p-cresol, o-, m- or p-ethylphenol, o-, m- or p-propylphenol, o-, m- or p-butylphenol, o-, m- or p-chlorophenol, salicylic acid, hydroxybenzoic acid and hydroxynaphthalene; polyvalent phenolic compounds such as catechol and resorcinol; and polymer compounds such as a phenol resin, polyphenol and poly(hydroxystyrene) or the like can be exemplified.

The phenolic compound is preferably alkoxy phenol, alkyl phenol or alkyl naphthol of which the number of carbon atoms of an alkyl group is 1 to 20, more preferably amyl phenol, methoxy phenol or isopropyl phenol, and further preferably p-tert-amylphenol, 4-methoxyphenol or 4-isopropyl phenol.

The molar concentration of the phenolic compound relative to 1 g of component (a) is preferably within a range of 1 mmol/g to 50 mmol/g. If the amount of the phenolic compound is too small, there is a possibility that the effect of improving electrical conductivity cannot be obtained. Further, if the amount is too large, the homogeneity of an organic solution may be deteriorated and much labor such as time and heat is required when removing by evaporation. As a result, a material that is poor in transparency or electric characteristics may be obtained. In particular, the amount of the phenolic compound is preferably within a range of 2 mmol/g to 20 mmol/g.

It is preferred that the phenolic compound be a phenolic compound represented by the following formula (1). It is further preferred that the weight ratio of the phenolic compound represented by the formula (1) and the doped polyaniline (phenolic compound/doped polyaniline) be 0.01 to 10.0.

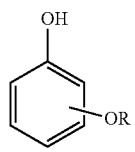

(1)

wherein in the formula, R is an alkyl group including 1 to 20 carbon atoms, an alkenyl group including 2 to 20 carbon atoms, a cycloalkyl group including 3 to 10 carbon atoms, an alkylthio group including 1 to 20 carbon atoms, an aryl group including 6 to 20 carbon atoms, an alkylaryl group including 7 to 20 carbon atoms or an arylalkyl group including 7 to 20 carbon atoms.

In the phenolic compound represented by the formula (1), the substitution position of —OR is preferably a meta- or para-position relative to the phenolic hydroxyl group. By allowing the substitution position of —OR to be a meta- or para-position, the steric hindrance of the phenolic hydroxyl group is lowered, whereby conductivity of the composition can be further improved.

As the phenolic compound, a phenolic compound represented by the following formula (2) may be used. It is preferred that the weight ratio of the phenolic compound represented by the formula (2) and the doped polyaniline (phenolic compound/doped polyaniline) be 0.01 to 5.0.

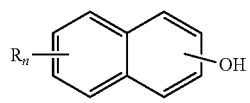

(2)

wherein n is an integer of 0 to 6.

R is independently an alkyl group including 2 to 10 carbon atoms, an alkenyl group including 2 to 20 carbon atoms, an alkylthio group including 1 to 20 carbon atoms, a cycloalkyl group including 3 to 10 carbon atoms, an aryl group including 6 to 20 carbon atoms, an alkylaryl group including 7 to 20 carbon atoms or an arylalkyl group including 7 to 20 carbon atoms.

As the phenolic compound, a phenolic compound represented by the formula (3) may be used. It is preferred that the weight ratio of the phenolic compound represented by the formula (3) and the doped polyaniline (phenolic compound/doped polyaniline) be 0.01 to 10.0.

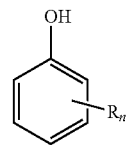

(3)

wherein n is an integer of 1 to 5.

R is independently an alkyl group including 2 to 10 carbon atoms, an alkenyl group including 2 to 20 carbon atoms, an alkylthio group including 1 to 20 carbon atoms, a cycloalkyl group including 3 to 10 carbon atoms, an aryl group including 6 to 20 carbon atoms, an alkylaryl group including 7 to 20 carbon atoms or an arylalkyl group including 7 to 20 carbon atoms.

As for R in the formulas (1), (2) and (3), as the alkyl group, methyl, ethyl, propyl, isopropyl, butyl, isobutyl, t-butyl, t-amyl or the like can be given.

As the alkenyl group, a substituent having an unsaturated bond within a molecule of the above-mentioned alkyl group can be given.

As the cycloalkyl group, cyclopentane, cyclohexane or the like can be given.

As the alkylthio group, methylthio, ethylthio or the like can be given.

As the aryl group, phenyl, naphthyl or the like can be given.

As the alkylaryl group and the arylalkyl group, a substituent obtained by combining the alkyl group and the aryl group mentioned above or the like can be given.

Among these groups, as R, methyl or ethyl is preferable.

The organic solution comprising the component (a) and the component (b) may comprise a solvent.

The solvents may be an organic solvent or an inorganic solvent such as water. The solvents may be used singly or in combination of two or more. An organic solvent is preferable.

The organic solvent may be a water-soluble organic solvent or an organic solvent that is substantially immiscible with water (water-immiscible organic solvent).

The above-mentioned water-soluble organic solvent may be a protonic polar solvent or a non-protonic polar solvent. As examples thereof, alcohols such as isopropanol, 1-butanol, 2-butanol, 2-pentanol, benzyl alcohol, 1-methoxy-2-propanol and 3-methoxy-1-butanol; ketones such as acetone; ethers such as tetrahydrofuran and dioxane; non-protonic polar solvents such as N-methyl pyrrolidone or the like can be given.

As examples of the water-immiscible organic solvents, a hydrocarbon solvent such as hexane, benzene, toluene, xylene, ethylbenzene and tetraline; a halogen-containing solvent such as methylene chloride, chloroform, carbon tetrachloride, dichloroethane and tetrachloroethane; ester solvents such as ethyl acetate, isobutyl acetate and n-butyl acetate; a ketone solvent such as methyl isobutyl ketone, methyl ethyl ketone, cyclopentanone and cyclohexanone; and an ether solvent such as cyclopentyl methyl ether, or the like can be given. Among these, toluene, xylene, methylisobutylene (MIBK), chloroform, trichloroethane and ethyl acetate are preferable since these are excellent in doped polyaniline solubility.

Alcohol is preferable in respect of reducing environment burden as compared with an aromatic hydrocarbon such as toluene.

When an organic solvent is used as a solvent, by using a mixed organic solvent obtained by mixing a water-immiscible organic solvent and a water-soluble organic solvent at 99 to 50:1 to 50 (mass ratio), generation of gels or the like during storage can be prevented, realizing a long-term storage.

As the water-immiscible organic solvent of the above-mentioned mixed organic solvent, a low-polarity organic solvent can be used. As the low-polarity organic solvent, toluene or chloroform is preferable. Further, as the water-soluble organic solvent of the mixed organic solvent, a high-polarity organic solvent can be used. As examples thereof, methanol, ethanol, isopropyl alcohol, 2-methoxyethanol, 2-ethoxyethanol, acetone, methyl ethyl ketone, methyl isobutyl ketone, tetrahydrofuran or diethyl ether is preferable.

The amount ratio of the component (a) in the solvent depends on the type of the solvent, but is normally 900 g/kg or less, preferably 0.01 g/kg or more and 300 g/kg or less, more preferably 10 g/kg or more and 300 g/kg or less, and further preferably 30 g/kg or more and 300 g/kg or less.

If the content of the component (a) is too large, the solution state cannot be retained, thus leading to difficulty in handling when molding a composition to obtain a molded product. In addition, uniformity of a molded product is deteriorated, whereby electrical properties or mechanical properties and transparency of a molded product may be lowered. On the other hand, when the content of the component (a) is too small, only a significantly thin film can be produced, and production of a homogenous conductive film may become difficult when molding in a method described later.

An organic solvent may comprise an acidic substance or its salts. Further, an organic solvent may comprise a plurality of different types of acidic substance. It may comprise a plurality of different acidic substances and salts thereof.

By incorporating an acidic substance or its salts, an increase in resistance can be further suppressed.

The acidic substance may be any of an organic acid that is an acid of an organic compound and an inorganic acid that is an acid of an inorganic compound. The acidic substance is preferably an organic acid.

The acidic substance is preferably an organic acid comprising one or more acidic groups such as a sulfonic acid group, a phosphoric acid group, a phosphonic acid group and a carboxyl group.

It is preferred that the acidic substance be a cyclic, chain-like or branched alkyl acid comprising one or more acidic acids or a substituted or unsubstituted aromatic acid comprising one or more acidic groups.

Further, it is preferred that the aromatic acid be an acid comprising a naphthalene skeleton.

The organic acid comprising the sulfonic acid group is preferably a cyclic, chain-like or branched alkyl sulfonic acid, a substituted or unsubstituted aromatic sulfonic acid or a polysulfonic acid that have one or more sulfonic acid groups.

As the above-mentioned alkylsulfonic acid, methane sulfonic acid, ethane sulfonic acid and di-2-ethylhexyl sulfosuccinic acid can be given, for example.

As the aromatic sulfonic acid, sulfonic acid having a benzene ring, sulfonic acid having a naphthalene skeleton and a sulfonic acid having an anthracene skeleton can be given, for example. As the aromatic sulfonic acid, substituted or unsubstituted benzene sulfonic acid, naphthalene sulfonic acid and anthracene sulfonic acid can be given. For example, the substituent is selected from the group consisting of an alkyl group, an alkoxy group, a hydroxyl group, a nitro group, a carboxy group and an acyl group, and the aromatic sulfonic acid may be substituted by one or more of these substituents. For example, naphthalene sulfonic acid, dodecylbenzene sulfonic acid and anthraquinone sulfonic acid can be given. As the aromatic sulfonic acid, substituted or unsubstituted naphthalene sulfonic acid is preferable.

The polysulfonic acid mentioned above is sulfonic acid in which the main chain or side chain of the polymer chain is substituted by a plurality of sulfonic acid groups. Polystyrenesulfonic acid can be given, for example.

The alkyl group is preferably a straight-chain or branched alkyl group including 1 to 18 carbon atoms.

The above-mentioned organic acid having a carboxyl group is preferably a cyclic, chain-like or branched alkyl carboxylic acid or a substituted or unsubstituted aromatic carboxylic acid which acids have one or more carboxy groups.

As examples of the above-mentioned alkyl carboxylic acid, undecylenic acid, cyclohexanecarboxylic acid, 2-ethylhexanoic acid or the like can be given, for example.

As examples of the aromatic carboxylic acid, substituted or unsubstituted benzene carboxylic acid, naphthalene carboxylic acid or the like can be given. For example, the substituent is selected from the group consisting of a sulfonic acid group, an alkyl group, an alkoxy group, a hydroxyl group, a nitro group and an acyl group, and the aromatic carboxylic acid may be substituted by one or more of these substituents. For example, salicylic acid, benzoic acid, naphthoic acid, trimesic acid or the like can be given.

The alkyl group is preferably a straight-chain or branched alkyl group including 1 to 18 carbon atoms.

The organic acid having a phosphoric acid group or a phosphonic acid group is preferably a cyclic, chain-like or branched alkylphosphoric acid or alkylphosphonic acid or substituted or unsubstituted aromatic phosphoric acid or substituted or unsubstituted aromatic phosphonic acid, which acids have one or more phosphoric acid groups or phosphonic acid groups.

As the above-mentioned alkylphosphoric acid or alkylphosphonic acid, dodecyl phosphoric acid, phosphoric acid hydrogen bis(2-ethylhexyl) or the like can be given, for example.

As the aromatic phosphoric acid or the aromatic phosphonic acid mentioned above, substituted or unsubstituted benzene sulfonic acid, naphthalene phosphonic acid or the like can be given. As the substituent, a substituent selected from the group consisting of an alkyl group, an alkoxy group, a hydroxyl group, a nitro group, a carboxyl group and an acyl group can be given, for example. The aromatic phosphoric acid or the aromatic phosphonic acid may be substituted by one or more of these substituents. Phenylphosphonic acid or the like can be given.

The alkyl group is preferably a straight-chain or branched alkyl group including 1 to 18 carbon atoms.

It is preferred that the acidic substance have an acidity (pKa) of 5.0 or less. The lower limit of the acidity (pKa) is not particularly restricted. If an acidic substance having an acidity of −4.0 or less is added, for example, a π conjugated polymer may be deteriorated.

The acidity (pKa) is defined by the computational chemistry method. That is, the method described in the Journal of Physical Chemistry (1995, vol. 99, page. 2224) is used in which the charge density on the molecular surface is calculated by the quantum chemical calculation developed by A. Klamt et al. and the interaction between different molecules is calculated as an activity coefficient.

Specifically, by means of "TURBOMOLE Version 6.1" (manufactured by COSMOlogic GmbH Co., Ltd.), the structure is optimized by TZVP as a basis function. By using this structure, the COSMO-RS calculation is conducted by using "COSMO therm Version C2.1 Release 01.10" (manufactured by COSMOlogic GmbH Co., Ltd.).

Here, to the "COSMO thermos Version C2.1 Release 01.10", the conditions of a water solvent at 25° C., the chemical formula of molecules and the chemical formula of deprotonated molecules are input, thereby to calculate the pKa.

In the organic solution, the content of at least one of the acidic substances and the salt of acidic substances is preferably 1 to 1,000 parts by mass, more preferably 5 to 100 parts by mass, relative to 100 parts by mass of doped polyaniline.

If the amount exceeds 1,000 parts by mass, the viscosity of the organic solution is increased to generate aggregates, whereby stability of the solution may be lowered.

The organic solution may further comprise additives such as other resins, inorganic materials, curing agents, plasticizers and organic conductive materials.

Other resins are added as a binder, a plasticizer and a matrix, for example.

As specific examples of the other resins, polyolefin such as polyethylene and polypropylene; chlorinated polyolefin, polystyrene, polyester, polyamide, polyacetal, polyethylene terephthalate, polycarbonate, polyethylene glycol, polyethylene oxide, polyacrylic acid, polyacrylic acid ester, polymethacrylic acid ester and polyvinyl alcohol can be given.

Instead of, or together with the above-mentioned resins, a thermosetting resin such as an epoxy resin, an urethane resin and a phenol resin or a precursor capable of forming these thermosetting resins may be contained.

The inorganic material is added in order to improve strength, surface hardness, dimensional stability and other mechanical properties, or to improve electrical properties such as conductivity.

As specific examples of the inorganic material, silica (silicon dioxide), titania (titanium dioxide), alumina (aluminum dioxide), Sn-containing $In_2O_3$(ITO), Zn-containing $In_2O_3$, co-deposited compounds of $In_2O_3$ (an oxide in which the trivalent In is substituted by a tetravalent element and a divalent element), Sb-containing $SnO_2$ (ATO), ZnO, Al-containing ZnO (AZO), Ga-containing ZnO (GZO) or the like can be given.

The curing agent is added in order to improve strength, surface hardness, dimensional stability and other mechanical properties, for example. As specific examples of the curing agent, a heat curing agent such as a phenol resin, and a light curing agent composed of an acrylate-based monomer and a photopolymerization initiator can be given, for example.

A plasticizer is added in order to improve mechanical properties such as tensile strength, bending strength or the like, for example.

As specific examples of a plasticizer, phthalic acid esters or phosphoric acid esters can be given, for example. As the organic conductive material, carbon materials such as carbon black and carbon nanotube or conductive polymers other than polyaniline can be given, for example.

The method for producing an organic solution is not particularly restricted, and an organic solution can be prepared by a known method. For example, it can be prepared by a method disclosed in WO2005/052058.

A composition can be obtained by removing a solvent from an organic solution. It is preferred that the composition be a thin film.

The solvent may be removed after applying an organic solution onto a substrate.

As the substrate, glass, a resin film, a resin sheet, an unwoven fabric or the like can be given. As the applying method, a known method such as casting method, spraying method, dip coating method, doctor blading method, bar coating method, spin coating method, electrospinning method, screen printing method, gravure printing method, or the like can be used.

As the method for removing a solvent, drying or the like can be given.

The drying temperature is preferably 80 to 200° C., more preferably 100 to 170° C.

The drying time is preferably 1 to 180 minutes, more preferably 3 to 60 minutes.

According to need, heating may be conducted under reduced pressure. Heating temperature and heating time are not particularly restricted, and may be appropriately selected according to the materials used.

The solution in which the above-mentioned composition is immersed comprises at least one of sulfonic acids and sulfonates.

The sulfonic acids or sulfonates are preferably organic sulfonic acids or organic sulfonates, with aromatic sulfonic acids or salts of aromatic sulfonic acids being more preferable.

The sulfonic acid or the sulfonate is preferably a compound represented by the following formula (4) or (5) or its salts.

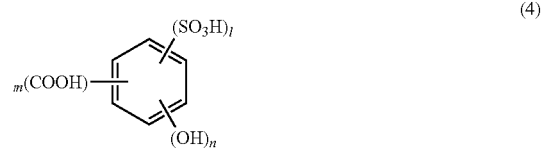

(4)

In the formula (4), l is one or more, m is 0 or more and n is 0 or more. When one of m and n is 0, the other is 1 or more.

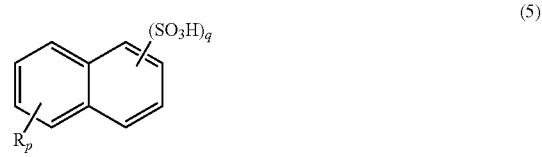

(5)

In the formula (5), q is 1 or more, p is 0 or more and R is independently an alkyl group including 1 to 20 carbon atoms, a carboxy group, a hydroxyl group, a nitro group, a cyano group and an amino group.

l is preferably 1 to 3, m is preferably 1 to 3 and n is preferably 1 to 3.

q is preferably 1 to 3. p is preferably 0 to 3. R is preferably an alkyl group including 1 to 20 carbon atoms, a carboxy group and a hydroxyl group.

As the sulfonic acid, 4-sulfophthalic acid, 5-sulfoisophthalic acid, 5-sulfosalicylic acid, 1-naphthalenesulfonic acid, 2-naphthalenesulfonic acid, 2-hydroxy-6-naphthalenesulfonic acid, p-phenolsulfonic acid, toluenesulfonic acid, p-xylene-2-sulfonic acid, 4,4'-biphenyldisulfonic acid, dibenzofuran-2-sulfonic acid, flavianic acid, (+)-10-camphorsulfonic acid, monoisopropyl naphthalene sulfonic acid, 1-pyrenesulfonic acid or the like can be given.

In respect of improving heat resistance, 4-sulfophthalic acid, 5-sulfosalicylic acid, 5-sulfoisophthalic acid, 2-naphthalenesulfonic acid, dibenzofuran-2-sulfonic acid, flavianic acid, 2-hydroxy-6-naphthalenesulfonic acid and 1-pyrenesulfonic acid are preferable.

In respect of improving conductivity, p-phenolsulfonic acid is preferable.

As the salt of sulfonic acid, salts of the above-mentioned sulfonic acid can be given. As the counter ion of the salt, sodium, lithium, potassium, cesium, ammonium, calcium, barium or the like can be given.

The solution for the immersion may contain a solvent.

The solvent is not particularly restricted as long as the organic sulfonic acid can be dissolved therein, and water, an alcohol-based solvent, a ketone-based solvent, an ether-based solvent, an ester-based solvent or the like can be given. These solvents may be used singly or in combination.

As specific examples of the solvent, methanol, ethanol, isopropanol, n-butanol, 1-methoxy-2-propanol, 3-methoxy-1-butanol, 3-methoxy-3-methyl butanol, 1-ethoxy-2-propanol, ethyl acetate, butyl acetate, MIBK, methyl ethyl ketone (MEK), ethylene glycol mono tert-butyl ether, propylene glycol monomethyl ether acetate, dipropylene glycol monomethyl ether or the like can be given.

The content of sulfonic acid or sulfonate in the immersion solution is preferably 10 to 1,200 parts by mass, more preferably 30 to 700 parts by mass, and further preferably 70 to 400 parts by mass, relative to 1 part by mass of the composition obtained by removing the solvent.

If the content exceeds 1,200 parts by mass, an acidic substance may be excessive in a coating film, and as a result, deterioration of the polyaniline main chain may be caused, thereby reducing the conductivity.

The amount of the sulfonic acid or the sulfonate in the immersion solution is preferably 0.1 wt % to 10 wt %, more preferably 0.3 wt % to 6 wt %, and further preferably 0.7 wt % to 3.5 wt %.

As the method for immersion, dipping or the like can be given.

The immersion time is preferably 1 minute or longer, more preferably 3 minutes or longer and 200 minutes or shorter, with 7 minutes or longer to 30 minutes or shorter being further preferable.

The immersion temperature is preferably 5° C. to 50° C.

It is preferred that drying after the immersion be conducted by using an oven, a hot plate or the like.

Drying temperature is preferably 80 to 200° C., with 100 to 170° C. being more preferable.

Drying time is preferably 1 to 180 minutes, more preferably 3 to 60 minutes. According to need, heating may be conducted under reduced pressure. The drying temperature and the drying time are not particularly restricted, and may be appropriately selected according to the materials used.

The thickness of the polyaniline complex conductive film is normally 1 mm or less, preferably 10 nm or more and 50 µm or less. The film with such a thickness range has advantages that it hardly undergoes cracking at the time of film forming and exhibits uniform electrical properties.

The polyaniline complex composition of the invention can a self-support type shaped product having no substrate.

To be a self-support type shaped product, preferably, by incorporating the above-mentioned resins into the organic solution, a shaped product having a desired mechanical strength can be obtained.

It is preferred that the polyaniline complex composition of the invention and the polyaniline complex composition obtained by the method of the invention have a conductivity of 100 S/cm or more or 120 S/cm or more.

A capacitor can be obtained from the polyaniline complex composition obtained by the method of the invention and the polyaniline complex composition of the invention.

As the capacitor of the invention, an electrolytic capacitor and an electric double layer capacitor can be specifically given. An electrolytic capacitor includes a solid electrolytic capacitor.

According to the method of the invention, by forming a polyaniline complex composition on a substrate, a conductive laminate body can be obtained.

As the substrate, the same substrates as those mentioned above can be given.

By processing the conductive laminate body into a desired shape by a known method such as vacuum shaping or pressure shaping, a conductive article can be produced.

EXAMPLES

Production Example 1

In a 1,000 ml-separable flask, 32.4 g of Neocol SWC (sodium diisooctylsulfosuccinate: manufactured by DKS Co., Ltd.), 13.3 g of aniline and 0.9 g of sorbon T-20 (non-ionic emulsifier having a polyoxyethylene sorbitan fatty acid ester structure manufactured by Toho Chemical Industry Co., Ltd.) were put, and dissolved in 320.4 g of toluene. To the resultant, 450 g of 8.4 wt % aqueous solution of phosphoric acid was added, and a reaction liquid having two liquid phases, i.e. toluene and water, was stirred. The internal temperature of the reaction liquid was cooled to 5° C. When the internal temperature of the reaction liquid reached 5° C., with stirring, a solution obtained by dissolving 39.3 g of ammonium persulfate (APS) in 90.2 g of 8.4 wt % phosphoric acid aqueous solution was added dropwise through a dripping funnel for 1 hour. After completion of the dropwise addition, stirring was conducted for further 8 hours (total reaction time: 9 hours), maintaining the internal temperature of the solution at 5° C.

After stopping of the stirring, the content was transferred to a separating funnel, and a water layer and a toluene layer were separated by allowing the solution to stand. After the separation, the organic layer was washed once with 180.3 g of a 1M phosphoric acid aqueous solution and five times with 328.0 g of ion exchange water, whereby a toluene solution of a polyaniline complex was obtained.

The resulting solution was filtrated with a No. 2 filter paper to remove insoluble matters, whereby a toluene solution of a polyaniline complex was obtained. This solution was transferred to an evaporator, heated at 60° C. and decompressed to remove volatile matters by evaporation, whereby a polyaniline complex (protonated polyaniline) was obtained.

Production Example 2

A polyaniline complex was obtained by conducting the same reaction as in Example 1, except that the internal temperature of the reaction liquid was changed to −5° C. and the concentration of an aqueous solution of phosphoric acid was changed to 17 wt %.

Production Example 3

A polyaniline complex was obtained by conducting the same reaction as in Example 1, except that the internal temperature of the reaction liquid was changed to 0° C. and the concentration of an aqueous solution of phosphoric acid was changed to 17 wt %.

Example 1

[Preparation of Conductive Composition]

8.7 g of isopropanol (manufactured by Wako Pure Chemical Industries, Ltd.), 8.7 g of p-tert-amylphenol (manufactured by Wako Pure Chemical Industries, Ltd.) and 2.6 g of hexane (manufactured by Wako Pure Chemical Industries, Ltd.) were mixed with stirring, whereby a homogenous mixed solvent was obtained. In 9.5 g of this mixed solvent, 0.5 g of the polyaniline complex obtained in Production Example 1 was dissolved to prepare a homogenous conductive composition.

[Production of Conductive Polyaniline Thin Film]

About 1 ml of the thus obtained conductive composition was applied to the upper surface of a glass substrate 1 on which an ITO electrode 2 was formed thereon by patterning shown in FIG. 1. Specifically, application was conducted by spin coating. The application by spin coating was conducted in the atmosphere of nitrogen. In the spin coating method, the glass substrate rotating time after dropwise addition of the conductive composition onto the glass substrate was 15 seconds. The glass substrate rotation speed was 2,000 rpm. Thereafter, the glass substrate was dried to form a conductive polyaniline thin film.

Here, the drying was conducted in a nitrogen atmosphere. The drying time was 5 minutes. The drying temperature was 1500° C. As a result, on the glass substrate, 0.9 mg of a conductive polyaniline thin film was obtained.

[Sulfonic Acid Immersion Treatment]

0.2 g of 2-naphthalene sulfonic acid hydrate (manufactured by Tokyo Kasei Industry Co., Ltd.) was dissolved in 19.8 g of isopropanol (manufactured by Wako Pure Chemical Industries, Ltd.), whereby a homogenous 1% naphthalene sulfonic acid solution was obtained.

The above-mentioned polyaniline thin film was immersed in 10 g of a 1% naphthalene sulfonic acid solution for 5 minutes. After the immersion, drying was conducted at 150° C. for 5 minutes, whereby a conductive polyaniline thin film immersed in sulfonic acid was obtained.

[Conductivity Measurement of Conductive Polyaniline Thin Film]

Figure 2:
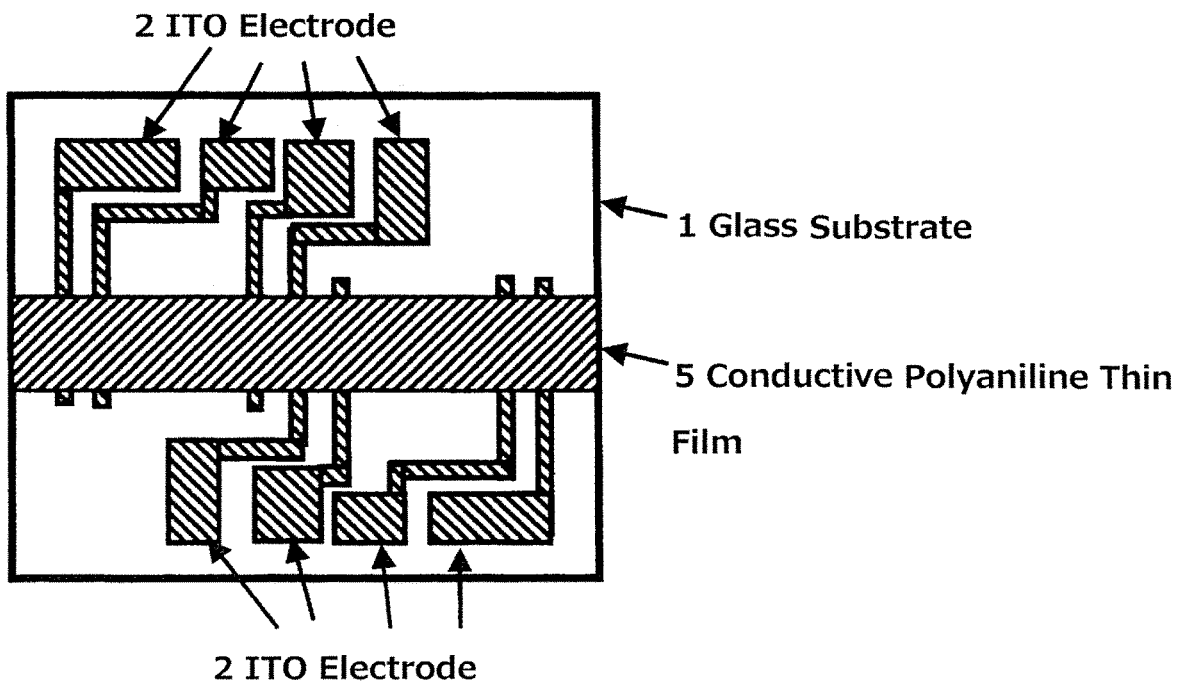
FIG. 2 is a view showing an upper surface of a glass substrate on which the terminals of the ITO electrode are exposed by shaving a conductive polyaniline thin film.

As for the treated conductive polyaniline thin film, as shown in FIG. 2, parts of a conducted polyaniline thin film 5 that had covered the terminals of the ITO electrode was shaved off in the nitrogen atmosphere, whereby the terminals of the ITO electrode were exposed to the surface. By using the terminals of the ITO electrode exposed to the surface, the resistance and the conductivity of the thin film were measured by means of a Loresta-GP (a resistivity meter by a four probe method manufactured by Mitsubishi Chemical Corporation).

The resistance immediately after the film formation was taken as an initial value $R_0$. The conductivity was 150 S/cm.

[Heat Resistance Test at 145° C. of Conductive Polyaniline Thin Film]

The thin film of the obtained conductive polyaniline composition was allowed to stand, with being formed on the glass substrate, in a nitrogen atmosphere for a prescribed period of time at 145° C. After the lapse of a prescribed period of time, after lowering the temperature of a thin film to room temperature, measurement of resistance was conducted in the same manner as in the initial value $R_0$. After the lapse of a prescribed period of time (one day after, two days after, etc.), the ratio $R/R_0$ (the ratio of the resistance R and the initial resistance $R_0$) was calculated, and the deterioration of the thin film with a lapse of time (ratio of increase of the resistance) was evaluated. The results are shown in Tables 1 and 2.

The value of $R/R_0$ in the tables shows the ratio of R and the initial value $R_0$ after the lapse of a prescribed period of time.

Example 2

Production, treatment and evaluation were conducted in the same manner as in Example 1, except that the sulfonic acid immersion treatment time was changed to 10 minutes.

The conductivity was 189 S/cm. The results are shown in Tables 1 and 2.

Example 3

Production, treatment and evaluation were conducted in the same manner as in Example 1, except that the sulfonic acid immersion treatment time was changed to 30 minutes.

Conductivity was 144 S/cm. The results are shown in Tables 1 and 2.

Example 4

Production, treatment and evaluation were conducted in the same manner as in Example 1, except that the sulfonic acid immersion treatment time was changed to 60 minutes.

Conductivity was 177 S/cm. The results are shown in Tables 1 and 2.

Example 5

Production, treatment and evaluation were conducted in the same manner as in Example 1, except that the sulfonic acid treatment time was changed to 180 minutes.

Conductivity was 127 S/cm. The results are shown in Tables 1 and 2.

Example 6

Production, treatment and evaluation were conducted in the same manner as in Example 1, except that the amount of 2-naphthalenesulfonic acid hydrate was changed to 0.1 g and the amount of isopropanol was changed to 19.9 g.

Conductivity was 103 S/cm. The results are shown in Tables 1 and 2.

Example 7

Production, treatment and evaluation were conducted in the same manner as in Example 1, except that the amount of 2-naphthalenesulfonic acid hydrate was changed to 0.4 g and the amount of isopropanol was changed to 19.6 g.

Conductivity was 194 S/cm. The results are shown in Tables 1 and 2.

Example 8

Production, treatment and evaluation were conducted in the same manner as in Example 1, except that the amount of 2-naphthalenesulfonic acid hydrate was changed to 0.6 g and the amount of isopropanol was changed to 19.4 g.

Conductivity was 115 S/cm. The results are shown in Tables 1 and 2.

Example 9

Production, treatment and evaluation were conducted in the same manner as in Example 1, except that the amount of 2-naphthalenesulfonic acid hydrate was changed to 1.0 g and the amount of isopropanol was changed to 19.0 g.

Conductivity was 45 S/cm. The results are shown in Tables 1 and 2.

Example 10

Production, treatment and evaluation were conducted in the same manner as in Example 2, except that 0.043 g of 2-naphthalenesulfonic acid hydrate was added relative to 10 g of the conductive composition.

Conductivity was 90 S/cm. The results are shown in Tables 1 and 2.

Example 11

Production, treatment and evaluation were conducted in the same manner as in Example 2, except that 0.086 g of 2-napthalenesulfonic acid hydrate was added relative to 10 g of the conductive composition.

Conductivity was 74 S/cm. The results are shown in Tables 1 and 2.

Example 12

Production, treatment and evaluation were conducted in the same manner as in Example 2, except that the polyaniline complex obtained in Production Example 2 was used.

Conductivity was 200 S/cm. The results are shown in Tables 1 and 2.

Example 13

Production, treatment and evaluation were conducted in the same manner as in Example 2, except that the polyaniline complex obtained in Production Example 3 was used.

Conductivity was 194 S/cm. The results are shown in Tables 1 and 2.

Example 14

Production, treatment and evaluation were conducted in the same manner as in Example 2, except that the polyaniline complex obtained in Production Example 2 was used and 0.043 g of 2-naphthalenesulfonic acid hydrate was added relative to 10 g of the conductive composition.

Conductivity was 276 S/cm. The results are shown in Tables 1 and 2.

Example 15

Production, treatment and evaluation were conducted in the same manner as in Example 2, except that the polyaniline complex obtained in Production Example 3 was used, and 0.043 g of 2-napthalenesulfonic acid hydrate was added relative to 10 g of the conductive composition.

Conductivity was 173 S/cm. The results are shown in Tables 1 and 2.

Example 16

Production, treatment and evaluation were conducted in the same manner as in Example 2, except that the solvent was changed from 19.8 g of isopropanol to a mixed solvent of 9.4 g of isopropanol and 9.4 g of ion exchange water.

Conductivity was 95 S/cm. The results are shown in Tables 1 and 2.

Example 17

Production, treatment and evaluation were conducted in the same manner as in Example 2, except that isopropanol was changed to 1-methoxy-2-propanol (manufactured by Wako Pure Chemical Industries, Ltd.).

Conductivity was 159 S/cm. The results are shown in Tables 1 and 2.

Example 18

Production, treatment and evaluation were conducted in the same manner as in Example 2, except that isopropanol was changed to 3-methoxy-1-butanol (manufactured by Wako Pure Chemical Industries, Ltd.).

Conductivity was 128 S/cm. The results are shown in Tables 1 and 2.

Comparative Example 1

Production and evaluation were conducted in the same manner as in Example 1, except that the sulfonic acid immersion treatment was not conducted.

Conductivity was 38 S/cm. The results are shown in Tables 1 and 2.

Comparative Example 2

Production and evaluation were conducted in the same manner as in Example 10, except that the sulfonic acid immersion treatment was not conducted.

Conductivity was 42 S/cm. The results are shown in Tables 1 and 2.

Comparative Example 3

Production, treatment and evaluation were conducted in the same manner as in Example 1, except that the amount of isopropanol was changed from 19.8 g to 20.0 g and 2-napthalenesulfonic acid hydrate was not used.

Conductivity was 20 S/cm. The results are shown in Tables 1 and 2.

Comparative Example 4

A conductive polyaniline thin film was obtained in the same manner as in Example 1. The obtained conductive polyaniline thin film was washed with 0.1M sodium hydroxide, whereby a de-doped polyaniline thin film was obtained.

0.1 g of dodecylbenzene sulfonic acid (manufactured by Tokyo Kasei Industry Co., Ltd.) was dissolved in 9.9 g of isopropanol, whereby a 1% dodecylbenzene sulfonic acid solution was obtained.

In the resulting solution, the above-mentioned de-doped polyaniline thin film was immersed for 10 minutes. After the immersion, drying was conducted at 150° C. for 5 minutes, whereby a dodecybenzene sulfonic acid-doped polyaniline thin film was obtained.

The obtained dodecylbenzenesulfonic acid-doped polyaniline thin film was subjected to a sulfonic acid immersion treatment in the same manner as in Example 2, and evaluated.

Conductivity was 79 S/cm. The results are shown in Tables 1 and 2.

TABLE 1

|  | Conductivity | $R/R_0$ relative to the lapsed days | | | | | | |
|---|---|---|---|---|---|---|---|---|
|  | (S/cm) | Initial value | 1 | 2 | 3 | 4 | 5 | 6 |
| Example 1 | 150 | 1.0 | — | 2.6 | — | — | 6.8 | — |
| Example 2 | 189 | 1.0 | — | 2.9 | — | — | 6.2 | — |
| Example 3 | 144 | 1.0 | — | — | — | 5.9 | — | 10.2 |
| Example 4 | 177 | 1.0 | — | 3.0 | — | — | 7.8 | — |
| Example 5 | 127 | 1.0 | — | 2.6 | — | — | 8.0 | — |
| Example 6 | 103 | 1.0 | — | 2.3 | — | — | 8.0 | — |
| Example 7 | 194 | 1.0 | — | 2.7 | — | — | 4.8 | — |
| Example 8 | 115 | 1.0 | — | 2.7 | — | — | 6.4 | — |
| Example 9 | 45 | 1.0 | — | — | — | 5.4 | — | 8.3 |
| Example 10 | 90 | 1.0 | 1.2 | 1.6 | — | 2.2 | — | — |
| Example 11 | 74 | 1.0 | 1.0 | 1.4 | — | 2.1 | — | 3.4 |
| Example 12 | 200 | 1.0 | — | 2.8 | — | 3.5 | — | — |
| Example 13 | 194 | 1.0 | — | — | — | — | — | 3.1 |
| Example 14 | 276 | 1.0 | 1.2 | — | 1.7 | — | — | 2.9 |
| Example 15 | 173 | 1.0 | 1.2 | — | 1.6 | — | — | 2.6 |
| Example 16 | 95 | 1.0 | — | 3.7 | — | — | — | — |
| Example 17 | 159 | 1.0 | — | 2.4 | — | — | — | — |
| Example 18 | 128 | 1.0 | — | 2.8 | — | — | — | — |
| Comp. Ex. 1 | 38 | 1.0 | — | — | 314.8 | — | 5569.0 | — |
| Comp. Ex. 2 | 42 | 1.0 | 6.4 | — | 14.1 | — | — | 53.3 |
| Comp. Ex. 3 | 20 | 1.0 | 20.5 | — | 1759.2 | — | — | — |
| Comp. Ex. 4 | 79 | 1.0 | — | 6.2 | — | 21.1 | — | — |

|  | $R/R_0$ relative to the lapsed days | | | | | | | |
|---|---|---|---|---|---|---|---|---|
|  | 7 | 8 | 9 | 11 | 12 | 13 | 14 | 15 |
| Example 1 | 11.5 | — | 21.2 | — | 48.5 | — | 88.0 | — |
| Example 2 | 9.1 | — | 16.3 | — | 40.7 | — | 74.6 | — |
| Example 3 | — | 17.4 | — | 39.3 | — | 77.9 | — | 138.0 |
| Example 4 | 12.2 | — | 23.0 | — | 58.7 | — | 79.4 | — |
| Example 5 | 15.0 | — | 39.0 | — | 159.7 | — | 270.8 | — |
| Example 6 | 14.8 | — | 32.6 | — | 104.7 | — | 204.3 | — |
| Example 7 | 14.5 | — | 26.1 | 47.6 | — | — | 110.4 | — |
| Example 8 | 10.0 | — | 16.3 | — | 32.4 | — | 52.3 | — |
| Example 9 | — | 12.4 | — | 35.0 | — | 55.4 | — | 94.0 |
| Example 10 | 3.3 | — | 4.4 | 5.7 | — | — | 9.0 | — |
| Example 11 | — | 5.0 | — | 7.1 | — | — | 13.6 | — |
| Example 12 | 5.1 | — | — | 9.0 | 14.8 | — | 22.7 | — |
| Example 13 | 3.7 | — | 7.5 | — | 16.1 | — | 24.5 | — |
| Example 14 | — | 3.8 | 4.4 | — | — | 6.8 | — | 7.7 |
| Example 15 | — | 3.3 | 4.2 | — | — | 6.3 | — | 7.5 |
| Example 16 | 22.5 | — | 98.4 | — | — | — | — | 1019.5 |
| Example 17 | 13.3 | — | 56.4 | — | — | — | — | 505.0 |
| Example 18 | 24.1 | — | 98.7 | — | — | — | — | 1035.5 |
| Comp. Ex. 1 | — | — | — | — | — | — | — | — |
| Comp. Ex. 2 | — | — | 195.8 | — | — | 1376.4 | — | 3604.9 |
| Comp. Ex. 3 | — | — | — | — | — | — | — | — |
| Comp. Ex. 4 | 147.4 | — | 410.3 | — | — | — | 3181.0 | — |

TABLE 2

|  | $R/R_0$ relative to lapsed days | | | | | | | | | | | |
|---|---|---|---|---|---|---|---|---|---|---|---|---|
|  | 16 | 19 | 20 | 21 | 23 | 26 | 28 | 30 | 33 | 37 | 42 | 44 |
| Example 1 | 167.6 | 338.6 | — | 502.2 | 957.7 | 3030.2 | 5115.3 | 9326.8 | 22633.7 | 57727.0 | — | — |
| Example 2 | 143.6 | 269.5 | — | 416.8 | 804.0 | 2880.0 | 5587.4 | 9664.6 | 22861.5 | 57759.6 | — | — |

TABLE 2-continued

| | R/R₀ relative to lapsed days | | | | | | | | | | | |
|---|---|---|---|---|---|---|---|---|---|---|---|---|
| | 16 | 19 | 20 | 21 | 23 | 26 | 28 | 30 | 33 | 37 | 42 | 44 |
| Example 3 | — | 551.4 | — | 1011.0 | — | 2273.2 | 5395.7 | — | 10846.9 | 37846.9 | — | — |
| Example 4 | 156.5 | 342.1 | — | 580.3 | 1106.9 | 3210.8 | 5520.9 | 9073.5 | 25664.7 | 74457.4 | — | — |
| Example 5 | 573.2 | 1396.4 | — | 2135.8 | 3967.8 | 10469.6 | 15850.1 | 27738.5 | 57875.8 | — | — | — |
| Example 6 | 421.5 | 970.5 | — | 1541.9 | 2797.5 | 8049.8 | 12693.5 | 21985.5 | 44077.2 | — | — | — |
| Example 7 | — | 344.2 | — | — | 984.6 | — | 3216.7 | 7178.3 | — | 24125.3 | — | 92148.0 |
| Example 8 | 89.5 | 158.5 | — | 235.1 | 350.0 | 686.1 | 1126.2 | 1632.3 | 3142.5 | 5770.5 | 17394.0 | 21459.3 |
| Example 9 | — | 176.3 | — | 251.9 | 382.7 | 814.9 | 1258.9 | 1708.6 | 2776.7 | 8761.0 | — | 13762.5 |
| Example 10 | 10.9 | — | — | 20.1 | — | 35.9 | — | 69.2 | 90.9 | 236.2 | 442.4 | — |
| Example 11 | 17.1 | — | — | 44.3 | — | 102.6 | — | 260.6 | 402.7 | 1146.0 | 2642.3 | — |
| Example 12 | 60.4 | 91.4 | — | 132.9 | 237.0 | — | 605.8 | — | 1247.9 | 2844.7 | 7224.9 | 14345.4 |
| Example 13 | 42.5 | 111.5 | — | 199.7 | 296.4 | 879.7 | — | 2305.7 | — | 9206.8 | 42332.1 | — |
| Example 14 | — | — | 13.9 | — | 18.1 | — | 31.0 | 36.1 | 50.1 | 76.3 | 136.7 | 192.7 |
| Example 15 | — | — | 17.5 | — | 28.2 | — | 54.9 | 63.9 | 96.2 | 166.8 | 358.4 | 578.1 |
| Example 16 | — | 3103.7 | — | 9721.8 | — | 29292.5 | — | — | — | — | — | — |
| Example 17 | — | 1315.9 | — | 3370.2 | — | 10804.2 | 31453.5 | 54974.6 | — | — | — | — |
| Example 18 | — | 2884.0 | — | 8514.4 | — | 25002.4 | 28722.5 | — | — | — | — | — |
| Comp. Ex. 1 | — | — | — | — | — | — | — | — | — | — | — | — |
| Comp. Ex. 2 | 7300.5 | 11699.5 | 19899.2 | 42045.1 | — | — | — | — | — | — | — | — |
| Comp. Ex. 3 | — | — | — | — | — | — | — | — | — | — | — | — |
| Comp. Ex. 4 | 10839.3 | — | — | — | — | — | — | — | — | — | — | — |

Example 19

Production, treatment and evaluation were conducted in the same manner as in Example 2, except that a mixed solvent of isopropanol, p-tert-amylphenol and hexane was changed to 9.5 g of toluene (manufactured by Wako Pure Chemical Industries, Ltd.) and 0.4 g of 4-methoxyphenol (manufactured by Wako Pure Chemical Industries, Ltd.).

Conductivity was 83 S/cm. The results are shown in Tables 3 and 4.

Example 20

Production, treatment and evaluation were conducted in the same manner as in Example 19, except that 4-methoxyphenol was changed to 0.4 g of p-tert-amylphenol (manufactured by Wako Pure Chemical Industries, Ltd.).

Conductivity was 187 S/cm. The results are shown in Tables 3 and 4.

Comparative Example 5

Production, treatment and evaluation were conducted in the same manner as in Example 19, except that 4-methoxyphenol was not used.

Conductivity was 74 S/cm. The results are shown in Tables 3 and 4.

Example 21

Production, treatment and evaluation were conducted in the same manner as in Example 2, except that 2-naphthalenesulfonic acid hydrate was changed to 0.4 g of about 50% aqueous solution of 4-sulfophtalic acid (manufactured by Tokyo Kasei Industry Co., Ltd.) and the amount of isopropanol was changed from 19.8 g to 19.6 g.

Conductivity was 148 S/cm. The results are shown in Tables 3 and 4.

Example 22

Production, treatment and evaluation were conducted in the same manner as in Example 2, except that 2-napthalenesulfonic acid hydrate was changed to 1.2 g of about 50% aqueous solution of 4-sulfophtalic acid, and the amount of isopropanol was changed from 19.8 g to 18.8 g.

Conductivity was 100 S/cm. The results are shown in Tables 3 and 4.

Example 23

Production, treatment and evaluation were conducted in the same manner as in Example 2, except that 2-naphthalenesulfonic acid hydrate was changed to 2.0 g of about 50% aqueous solution of 4-sulfophtalic acid, and the amount of isopropanol was changed from 19.8 g to 18.0 g.

Conductivity was 104 S/cm. The results are shown in Tables 3 and 4.

Example 24

Production, treatment and evaluation were conducted in the same manner as in Example 2, except that 0.043 g of 2-napthalenesulfonic acid hydrate was added relative to 10 g of a conductive composition and, in the sulfonic acid immersion, 2-naphthalenesulfonic acid hydrate was changed to 0.4 g of about 50% aqueous solution of 4-sulfophtalic acid and the amount of isopropanol was changed from 19.8 g to 19.6 g.

Conductivity was 120 S/cm. The results are shown in Table 3 and 4.

Example 25

Production, treatment and evaluation were conducted in the same manner as in Example 21, except that the polyaniline complex obtained in Production Example 2 was used.

The conductivity was 246 S/cm. The results are shown in Tables 3 and 4.

Example 26

Production, treatment and evaluation were conducted in the same manner as in Example 24, except that the polyaniline complex obtained in Production Example 2 was used.

Conductivity was 302 S/cm. The results are shown in Tables 3 and 4.

Example 27

Production, treatment and evaluation were conducted in the same manner as in Example 2, except that 2-naphthalenesulfonic acid hydrate was changed to 0.2 g of 5-sulfoisophthalic acid (manufactured by Wako Pure Chemical Industries, Ltd.).

Conductivity was 126 S/cm. The results are shown in Tables 3 and 4.

Example 28

Production, treatment and evaluation were conducted in the same manner as in Example 2, except that 2-naphthalenesulfonic acid hydrate was changed to 0.4 g of 5-sulfoisophthalic acid and the amount of isopropanol was changed from 19.8 g to 19.6 g.

Conductivity was 118 S/cm. The results are shown in Tables 3 and 4.

Example 29

Production, treatment and evaluation were conducted in the same manner as in Example 2, except that 2-naphthalenesulfonic acid hydrate was changed to 0.6 g of 5-sulfoisophthalic acid and the amount of isopropanol was changed from 19.8 g to 19.4 g.

Conductivity was 120 S/cm. The results are shown in Tables 3 and 4.

Example 30

Production, treatment and evaluation were conducted in the same manner as in Example 2, except that 2-naphthalenesulfonic acid hydrate was changed to 0.2 g of 5-sulfosalcylic acid dihydrate (manufactured by Wako Pure Chemical Industries, Ltd.).

Conductivity was 148 S/cm. The results are shown in Tables 3 and 4.

Example 31

Production, treatment and evaluation were conducted in the same manner as in Example 2, except that 2-naphthalenesulfonic acid hydrate was changed to 0.4 g of 5-sulfosalicylic acid dihydrate and the amount of isopanol was changed from 19.8 g to 19.6 g.

Conductivity was 124 S/cm. The results are shown in Tables 3 and 4.

Example 32

Production, treatment and evaluation were conducted in the same manner as in Example 2, except that 2-naphthalenesulfonic acid hydrate was changed to 0.6 g of 5-sulfosalicylic acid and the amount of isopropanol was changed from 19.8 g to 19.4 g.

Conductivity was 120 S/cm. The results are shown in Tables 3 and 4.

Example 33

Production, treatment and evaluation were conducted in the same manner as in Example 2, except that 2-naphtalanesulfonic acid hydrate was changed to 0.2 g of p-phenolsulfonic acid hydrate (manufactured by Tokyo Tokyo Kasei Industry Co., Ltd.).

Conductivity was 370 S/cm. The results are shown in Tables 3 and 4.

Example 34

Production, treatment and evaluation were conducted in the same manner as in Example 2, except that 2-naphthalenesulfonic acid hydrate was changed to 0.2 g of dibenzofuran-2-sulfonic acid hydrate (manufactured by Alfa Aesar).

Conductivity was 102 S/cm. The results are shown in Tables 3 and 4.

Example 35

Production, treatment and evaluation were conducted in the same manner as in Example 2, except that 2-naphthalenesulfonic acid hydrate was changed to 0.2 g of flavianic acid dihydrate (manufactured by Tokyo Kasei Industry Co., Ltd.).

Conductivity was 81 S/cm. The results are shown in Tables 3 and 4.

Example 36

Production, treatment and evaluation were conducted in the same manner as in Example 2, except that 2-naphthalenesulfonic acid hydrate was changed to 0.2 g of (+)-10-camphorsulfonic acid (manufactured by Tokyo Kasei Industry Co., Ltd.).

Conductivity was 177 S/cm. The results are shown in Tables 3 and 4.

Example 37

4 g of sodium monoisopropyl naphthalenesulfonate (manufactured by Takemoto Oil & Fat Company) was dissolved with stirring in 100 ml of ethyl acetate. When it was completely dissolved, 50 ml of a 1N aqueous solution of hydrochloric acid was added, and the resultant was stirred for 30 minutes. After the stirring, the reaction liquid was transferred to a separating funnel, and an organic phase was taken out, whereby a protonated monoisopropyl naphthalene sulfonic acid solution was obtained. The obtained solution was evaporated, and the solvent was removed. As a result, protonated monoisopropyl naphthalenesulfonic acid was obtained.

Production, treatment and evaluation were conducted in the same manner as in Example 2, except that 2-naphthalenesulfonic acid hydrate was changed to 0.2 g of monoisopropyl naphthalenesulfonic acid obtained above.

Conductivity was 48 S/cm. The results are shown in Tables 3 and 4.

Example 38

Production, treatment and evaluation were conducted in the same manner as in Example 2, except that 2-naphthalenesulfonic acid hydrate was changed to 0.2 g of 1-pyrenesulfonic acid (manufactured by FRINTON LABORATORIES Inc.).

Conductivity was 37 S/cm. The results are shown in Tables 3 and 4.

TABLE 3

| | Conductivity (S/cm) | Initial value | R/R₀ relative to lapsed days | | | | | | | | | | | | | |
|---|---|---|---|---|---|---|---|---|---|---|---|---|---|---|---|---|
| | | | 1 | 2 | 3 | 4 | 5 | 6 | 7 | 8 | 9 | 11 | 12 | 13 | 14 | 15 |
| Example 19 | 83 | 1.0 | — | 2.9 | — | — | 10.3 | — | 18.8 | — | 39.7 | — | 130.8 | — | 363.2 | — |
| Example 20 | 187 | 1.0 | — | 2.7 | — | — | 6.8 | — | 12.0 | — | 24.1 | — | 56.1 | — | 111.6 | — |
| Comp. Ex. 5 | 74 | 1.0 | — | 6.0 | — | — | 26.1 | — | 56.7 | — | 158.0 | — | 667.3 | — | 2114.3 | — |
| Example 21 | 148 | 1.0 | — | — | 1.4 | — | — | — | 2.2 | — | — | — | 3.1 | — | 3.4 | — |
| Example 22 | 100 | 1.0 | 1.4 | — | — | — | — | 2.3 | — | 2.9 | — | 4.2 | — | 5.3 | — | 7.2 |
| Example 23 | 104 | 1.0 | 1.6 | — | — | — | — | 2.3 | — | 2.7 | — | 3.6 | — | 4.0 | — | 4.5 |
| Example 24 | 120 | 1.0 | — | 1.6 | — | 2.1 | — | — | — | — | 2.9 | 3.3 | — | — | 3.9 | — |
| Example 25 | 246 | 1.0 | — | 1.6 | — | 2.1 | — | — | — | — | 2.6 | 2.9 | — | — | 3.5 | — |
| Example 26 | 302 | 1.0 | — | 1.0 | — | 1.3 | — | — | — | — | 1.5 | 1.5 | — | — | 1.8 | — |
| Example 27 | 126 | 1.0 | 1.2 | — | 1.5 | — | — | 2.1 | — | 2.8 | — | — | — | 5.8 | — | — |
| Example 28 | 118 | 1.0 | 1.2 | — | 1.5 | — | — | 2.0 | — | 2.6 | — | — | — | 4.7 | — | — |
| Example 29 | 120 | 1.0 | 1.2 | — | 1.4 | — | — | 1.7 | — | 2.1 | — | — | — | 3.4 | — | — |
| Example 30 | 148 | 1.0 | 1.5 | — | 2.0 | — | — | 2.6 | — | 4.1 | — | — | — | 11.5 | — | — |
| Example 31 | 124 | 1.0 | 1.3 | — | 1.6 | — | — | 2.2 | — | 2.9 | — | — | — | 6.4 | — | — |
| Example 32 | 120 | 1.0 | 1.3 | — | 1.6 | — | — | 2.3 | — | 3.0 | — | — | — | 6.5 | — | — |
| Example 33 | 370 | 1.0 | — | — | 2.3 | — | 4.0 | — | 6.7 | — | — | 22.8 | 53.8 | — | 107.4 | — |
| Example 34 | 102 | 1.0 | — | — | 2.6 | — | 4.1 | — | 6.6 | — | — | 14.6 | 21.2 | — | 35.2 | — |
| Example 35 | 81 | 1.0 | 1.7 | — | — | 2.6 | — | 3.6 | — | 4.9 | — | 8.6 | — | 13.1 | — | — |
| Example 36 | 177 | 1.0 | — | — | 3.9 | — | — | — | 17.8 | — | — | — | 132.7 | — | 254.3 | — |
| Example 37 | 48 | 1.0 | — | — | 2.1 | — | 3.7 | — | 6.0 | — | — | 11.4 | — | — | 31.6 | — |
| Example 38 | 37 | 1.0 | — | — | 3.2 | — | 5.9 | — | 8.2 | — | — | 15.2 | — | — | 35.3 | — |

TABLE 4

| | R/R₀ relative to lapsed days | | | | | | | |
|---|---|---|---|---|---|---|---|---|
| | 16 | 17 | 19 | 20 | 21 | 24 | 25 | 26 |
| Example 19 | — | — | 1720.4 | — | 3786.5 | — | 9783.6 | — |
| Example 20 | — | — | 518.6 | — | 1006.5 | — | 3745.5 | — |
| Comp. Ex. 5 | — | — | — | — | — | — | — | — |
| Example 21 | — | 4.0 | — | 4.7 | — | 5.8 | — | 6.4 |
| Example 22 | — | — | 10.8 | 17.8 | — | — | 42.1 | — |
| Example 23 | — | — | 5.9 | 7.7 | — | — | 14.4 | — |
| Example 24 | — | 4.4 | 5.3 | 6.9 | — | 8.5 | — | — |
| Example 25 | — | 4.0 | 4.5 | 5.6 | — | 7.4 | — | — |
| Example 26 | — | 1.9 | 2.4 | 2.4 | — | 2.7 | — | — |
| Example 27 | 8.2 | — | — | — | 13.4 | 22.9 | — | — |
| Example 28 | 6.6 | — | — | — | 12.4 | 20.1 | — | — |
| Example 29 | 4.7 | — | — | — | 7.9 | 12.7 | — | — |
| Example 30 | 23.4 | — | — | — | 63.6 | 145.1 | — | — |
| Example 31 | 9.1 | — | — | — | 21.0 | 35.1 | — | — |
| Example 32 | 9.8 | — | — | — | 30.9 | 50.2 | — | — |
| Example 33 | — | 340.1 | — | — | 49.3 | — | — | 124.1 |
| Example 34 | — | 53.2 | — | 103.5 | — | — | — | 216.0 |
| Example 35 | — | — | 28.9 | — | — | — | — | — |
| Example 36 | — | 902.0 | — | 3077.0 | — | 21969.6 | — | 54841.8 |
| Example 37 | — | — | 98.4 | 147.4 | — | 253.1 | — | — |
| Example 38 | — | — | 80.1 | 110.3 | — | 193.0 | — | — |

| | R/R₀ relative to lapsed days | | | | | |
|---|---|---|---|---|---|---|
| | 28 | 33 | 35 | 38 | 40 | 42 |
| Example 19 | 19843.1 | — | — | — | — | — |
| Example 20 | 8502.3 | 20469.0 | — | — | — | — |
| Comp. Ex. 5 | — | — | — | — | — | — |
| Example 21 | 6.9 | 8.6 | 9.4 | 10.7 | 11.6 | 13.9 |
| Example 22 | 65.9 | 127.1 | 203.7 | 290.4 | — | 515.3 |
| Example 23 | 19.0 | 32.5 | 49.3 | 71.2 | — | 102.7 |
| Example 24 | 13.4 | — | 22.0 | 30.6 | — | 41.7 |
| Example 25 | 12.4 | — | 27.9 | 42.3 | — | 58.1 |
| Example 26 | 3.7 | — | 4.9 | 6.0 | — | 7.2 |
| Example 27 | 40.9 | 104.3 | 171.7 | — | — | — |
| Example 28 | 34.1 | 105.9 | 175.5 | — | — | — |
| Example 29 | 10.3 | 33.2 | — | — | — | — |
| Example 30 | 319.7 | 3797.0 | 8163.8 | — | — | — |
| Example 31 | 65.8 | 268.6 | 467.1 | — | — | — |
| Example 32 | 105.4 | 717.3 | 1588.6 | — | — | — |
| Example 33 | 278.9 | 586.8 | 1293.9 | — | 6282.0 | — |
| Example 34 | 292.2 | 636.1 | — | 1484.2 | 2263.6 | 3033.0 |
| Example 35 | — | — | — | — | — | — |

TABLE 4-continued

| | | | | | | |
|---|---|---|---|---|---|---|
| Example 36 | — | — | — | — | — | — |
| Example 37 | 488.1 | 1719.5 | 2545.9 | — | 6813.4 | — |
| Example 38 | 285.3 | 619.5 | 868.6 | — | — | — |

INDUSTRIAL APPLICABILITY

The polyaniline complex composition obtained by the method of the invention and the polyaniline complex composition of the invention can be utilized, in the field of power electronics and optoelectronics, as an electrostatic or antistatic agent, a material for a transparent electrode and a conductive film, an electroluminescence device material, a material for a circuit, an electric wave shielding material, an electromagnetic wave shielding material, a dielectric material and an electrolysis of a capacitor, a material for a solar battery and a secondary battery, a fuel battery separator material or the like.

Although only some exemplary embodiments and/or examples of this invention have been described in detail above, those skilled in the art will readily appreciate that many modifications are possible in the exemplary embodiments and/or examples without materially departing from the novel teachings and advantages of this invention. Accordingly, all such modifications are intended to be included within the scope of this invention.

The specification of Japanese application on which Paris convention priority is claimed is incorporated herein by reference in its entirety.

The invention claimed is:

1. A method for producing a polyaniline complex composition comprising:
   removing a solvent from an organic solution that comprises (a) polyaniline doped with sodium diisooctylsulfosuccinate and (b) a phenolic compound, thereby to obtain a composition; and
   immersing the composition in (c) a solution that comprises at least one of sulfonic acid and sulfonate, followed by drying.

2. The method for producing a polyaniline complex composition according to claim 1, wherein aniline doped with sodium diisooctylsulfosuccinate is polymerized at a temperature of 0° C. or lower, thereby to obtain the polyaniline.

3. The method for producing a polyaniline complex composition according to claim 1, wherein the phenolic compound is alkoxy phenol, alkyl phenol or alkyl naphthol.

4. The method for producing a polyaniline complex composition according to claim 1, wherein the phenolic compound is amyl phenol, methoxy phenol or isopropyl phenol.

5. The method for producing a polyaniline complex composition according to claim 1, wherein the phenolic compound is p-tert-amylphenol, 4-methoxy phenol or 4-isopropyl phenol.

6. The method for producing a polyaniline complex composition according to claim 1, wherein the sulfonic acid or the sulfonate is aromatic sulfonic acid or aromatic sulfonate.

7. The method for producing a polyaniline complex composition according to claim 1, wherein the sulfonic acid or the sulfonate is a compound represented by the following formula (4) or (5), or salt thereof;

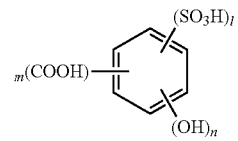

(4)

wherein in the formula (4), l is 1 or more, m is 0 or more and n is 0 or more, and if one of m and n is 0, the other is 1 or more; and

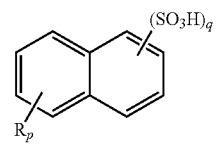

(5)

wherein in the formula (5), q is 1 or more, p is 0 or more, R is independently an alkyl group including 1 to 20 carbon atoms, a carboxy group, a hydroxyl group, a nitro group, a cyano group or an amino group.

8. The method for producing a polyaniline complex composition according to claim 1, wherein the sulfonic acid or the sulfonate is naphthalene sulfonic acid, phenol sulfonic acid, sulfophthalic acid, sulfoisophthalic acid, sulfosalcylic acid or salt thereof.

9. A polyaniline complex composition that is produced by the method according to claim 1.

10. A polyaniline complex conductive film comprising the polyaniline complex composition according to claim 9.

11. A capacitor that comprises the polyaniline complex conductive film according to claim 10.

12. A conductive stacked body comprising:
   a substrate; and
   the polyaniline complex conductive film according to claim 10 that is stacked on the substrate.

13. A conductive article obtained by forming the conductive stacked body according to claim 12.

14. A method for producing a polyaniline complex composition comprising:
   removing a solvent from an organic solution that comprises (a) polyaniline doped with sodium diisooctylsulfosuccinate (b) a phenolic compound, and an acidic substance or a salt of the acidic substance, thereby to obtain a composition; and
   immersing the composition in (c) a solution that comprises at least one of sulfonic acid and sulfonate, followed by drying.

15. The method for producing a polyaniline complex composition according to claim 14, wherein the acidic substance is an organic acid.

16. The method for producing a polyaniline complex composition according to claim 14, wherein the acidic substance is one or more acidic substances comprising one or more acidic groups selected from a sulfonic acid group, a phosphoric acid group, a phosphonic acid group and a carboxy group.

17. The method for producing a polyaniline complex composition according to claim 14, wherein the acidic substance is a cyclic, chain-like or branched alkyl acid comprising one or more acidic groups.

18. The method for producing a polyaniline complex composition according to claim 14, wherein the acidic substance is a substituted or unsubstituted aromatic acid having one or more acidic groups.

19. The method for producing a polyaniline complex composition according to claim 18, wherein the aromatic acid is an acid comprising a naphthalene skeleton.

20. The method for producing a polyaniline complex composition according to claim 14, wherein aniline doped with sodium diisooctylsulfosuccinate is polymerized at a temperature of 0° C. or lower, thereby to obtain the polyaniline.

21. The method for producing a polyaniline complex composition according to claim 14, wherein the phenolic compound is alkoxy phenol, alkyl phenol or alkyl naphthol.

22. The method for producing a polyaniline complex composition according to claim 14, wherein the phenolic compound is amyl phenol, methoxy phenol or isopropyl phenol.

23. The method for producing a polyaniline complex composition according to claim 14, wherein the phenolic compound is p-tert-amylphenol, 4-methoxy phenol or 4-isopropyl phenol.

24. The method for producing a polyaniline complex composition according to claim 14, wherein the sulfonic acid or the sulfonate is aromatic sulfonic acid or aromatic sulfonate.

25. The method for producing a polyaniline complex composition according to claim 14, wherein the sulfonic acid or the sulfonate is a compound represented by the following formula (4) or (5), or salt thereof;

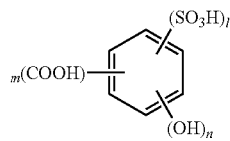

(4)

wherein in the formula (4), l is 1 or more, m is 0 or more and n is 0 or more, and if one of m and n is 0, the other is 1 or more; and (5)

wherein in the formula (5), q is 1 or more, p is 0 or more, R is independently an alkyl group including 1 to 20 carbon atoms, a carboxy group, a hydroxyl group, a nitro group, a cyano group or an amino group.

26. The method for producing a polyaniline complex composition according to claim 14, wherein the sulfonic acid or the sulfonate is naphthalene sulfonic acid, phenol sulfonic acid, sulfophthalic acid, sulfoisophthalic acid, sulfosalcylic acid or salt thereof.

27. A polyaniline complex composition that is produced by the method according to claim 14.

28. A polyaniline complex conductive film comprising the polyaniline complex composition according to claim 27.

29. A capacitor that comprises the polyaniline complex conductive film according to claim 28.

30. A conductive stacked body comprising:

a substrate; and the polyaniline complex conductive film according to claim 28 that is stacked on the substrate.

31. A conductive article obtained by forming the conductive stacked body according to claim 30.

* * * * *